US007219836B2

(12) United States Patent
Newburry

(10) Patent No.: US 7,219,836 B2
(45) Date of Patent: May 22, 2007

(54) VISITOR BADGE AND VISITOR BUSINESS CARD PHOTO IDENTIFICATION SYSTEM AND METHOD

(75) Inventor: Keith A. Newburry, Pasadena, CA (US)

(73) Assignee: Avery Dennison Corporation, Pasadena, CA (US)

( * ) Notice: Subject to any disclaimer, the term of this patent is extended or adjusted under 35 U.S.C. 154(b) by 143 days.

(21) Appl. No.: 11/136,753

(22) Filed: May 24, 2005

(65) Prior Publication Data

US 2006/0266820 A1 Nov. 30, 2006

(51) Int. Cl.
*G06K 5/00* (2006.01)

(52) U.S. Cl. ........................................ 235/380; 235/382

(58) Field of Classification Search ................ 235/380, 235/375, 382, 382.5, 486, 487
See application file for complete search history.

(56) References Cited

U.S. PATENT DOCUMENTS

| | | | | |
|---|---|---|---|---|
| 4,654,793 | A | 3/1987 | Elrod | |
| 5,706,517 | A | 1/1998 | Dickinson | |
| 5,732,229 | A | 3/1998 | Dickinson | |
| 5,853,837 | A | 12/1998 | Popat | |
| 5,920,053 | A | 7/1999 | DeBrouse | |
| 5,936,542 | A | 8/1999 | Kleinrock et al. | |
| 5,993,928 | A | 11/1999 | Popat | |
| 5,997,680 | A | 12/1999 | Popat | |
| 6,394,356 | B1 * | 5/2002 | Zagami | 235/487 |
| 6,473,728 | B1 | 10/2002 | Tognazzini | |
| 6,513,710 | B1 | 2/2003 | Haas | |
| 6,674,923 | B1 * | 1/2004 | Shih et al. | 382/305 |
| 2002/0059095 | A1 * | 5/2002 | Cook | 705/10 |
| 2004/0050931 | A1 * | 3/2004 | Ono et al. | 235/380 |
| 2004/0099731 | A1 * | 5/2004 | Olenick et al. | 235/380 |
| 2004/0205652 | A1 * | 10/2004 | Simpson et al. | 715/530 |
| 2005/0058369 | A1 * | 3/2005 | Sanse et al. | 382/282 |
| 2005/0178843 | A1 * | 8/2005 | Frohlich et al. | 235/487 |
| 2005/0252976 | A1 * | 11/2005 | Dietze | 235/488 |
| 2006/0087410 | A1 * | 4/2006 | Garcia et al. | 340/309.16 |

OTHER PUBLICATIONS

Sarah J.F. Braley, It's In The Badge, How RFID Technology Stores And Tracks Attendee Information, MeetingsandConventions, Jan. 2005.

* cited by examiner

*Primary Examiner*—Thien M. Le
*Assistant Examiner*—Edwyn Labaze
(74) *Attorney, Agent, or Firm*—Ingrassia Fisher & Lorenz, P.C.

(57) ABSTRACT

A system and method of supplying visitor badges and business cards for visitors to a facility includes an image capture device and/or storage device, a user interface, and a central processing unit (CPU). The image capture device selectively captures an image of a visitor and supplies visitor image data representative thereof to the CPU. The user interface is configured to receive visitor personal data supplied from a user and supplies the visitor personal data to the CPU. The CPU selectively commands a printer to print a visitor identification badge and, if so desired, one or more visitor business cards that include visitor contact information.

22 Claims, 3 Drawing Sheets

VISITOR BADGE AND VISITOR BUSINESS CARD PHOTO IDENTIFICATION SYSTEM AND METHOD

TECHNICAL FIELD

The present invention generally relates to visitor management systems and, more particularly, to a visitor management system and method for printing a visitor badge with an image of the visitor thereon and business cards associated with, and useable by, a visitor to a particular location.

BACKGROUND

Many businesses or other organized meeting locales, such as conventions, trade shows, and parties, use visitor management systems to register visitors to a facility. The visitor management system that is implemented at a particular facility may vary. One particular type of visitor management system, which is sold by Avery Dennison Corporation under the trade name Photo ID System, is implemented using a personal computer and a camera. This system allows access control personnel to quickly and efficiently register visitors (or the visitors can register themselves), generate photo identification badges, and may keep a digital record of facility visitors.

Once a visitor to a facility is registered and admitted into the facility, the visitor may discover the he or she has either forgotten their business cards or have brought an insufficient number of business cards to the facility. This situation can present certain drawbacks. For example, this situation can lead to embarrassment, both for the visitor and for the visitor's company, and may additionally lead to frustration on the part of both the visitor and the personnel the visitor contacts. For example, without an available business card, the visitor may need to rely on their own diligence in ensuring their contact information is left with the contact personnel he or she meets, and/or on the diligence of the contact personnel in requesting and retaining the contact information in a suitably retrievable form. In either instance, the likelihood that the visitor's contact information is not obtained and/or retained is increased, which can lead to inefficiencies on either, or both, the part of the visitor or the contact personnel. Moreover, even if the visitor does have sufficient numbers of business cards to provide contact personnel, the format of many business cards may not include the type of indicia that is conducive to remembering the visitor. Such instances can tend to frustrate the purpose of future contact between the visitor and the contact personnel.

Hence, there is a need for a system and method of visitor management that addresses at least the above-noted drawback. Namely, a system and method that addresses the situation in which a visitor to an access controlled facility has either no business cards or an insufficient number of business cards, and/or supplies business cards with memorable indicia thereon.

BRIEF SUMMARY

The present invention provides a system and method of supplying visitor badges and business cards for visitors to a facility. In one embodiment, and by way of example, only, a system for printing visitor identification badges and associated visitor business cards includes a storage device, a user interface, and a central processing unit (CPU). The storage device is configured to store and selectively supply visitor image data representative of an image of a visitor. The user interface is configured to receive visitor personal data supplied from a user, the visitor personal data representative of personal data specific to the visitor. The CPU is coupled to receive the visitor image data and the visitor personal data and is configured to selectively supply a visitor identification badge print command and a visitor business card print command. The visitor identification badge print command will cause a printer to print a visitor identification badge image that includes the stored image and at least selected portions of the visitor data, and the visitor business card print command will cause a printer to print a visitor business card image that includes at least selected portions of the visitor data.

In another exemplary embodiment, a method of supplying visitor identification badges and associated visitor business cards to a visitor includes supplying visitor image data representative of an image of the visitor. Visitor personal data that are representative of personal data specific to the visitor is received, and a visitor identification badge and a visitor business card are selectively printed. The visitor identification badge includes the image of the visitor and at least selected portions of the visitor data, and the visitor business card includes at least selected portions of the visitor data.

The visitor business card and the visitor identification badge may be output in the same size print area to allow the same print media to be used.

BRIEF DESCRIPTION OF THE DRAWINGS

The present invention will hereinafter be described in conjunction with the following drawing figures, wherein like numerals denote like elements, and wherein.

DETAILED DESCRIPTION OF PREFERRED EMBODIMENTS

The following detailed description of the invention is merely exemplary in nature and is not intended to limit the invention or the application and uses of the invention. Furthermore, there is no intention to be bound by any theory presented in the preceding background or the following detailed description.

Figure 1:
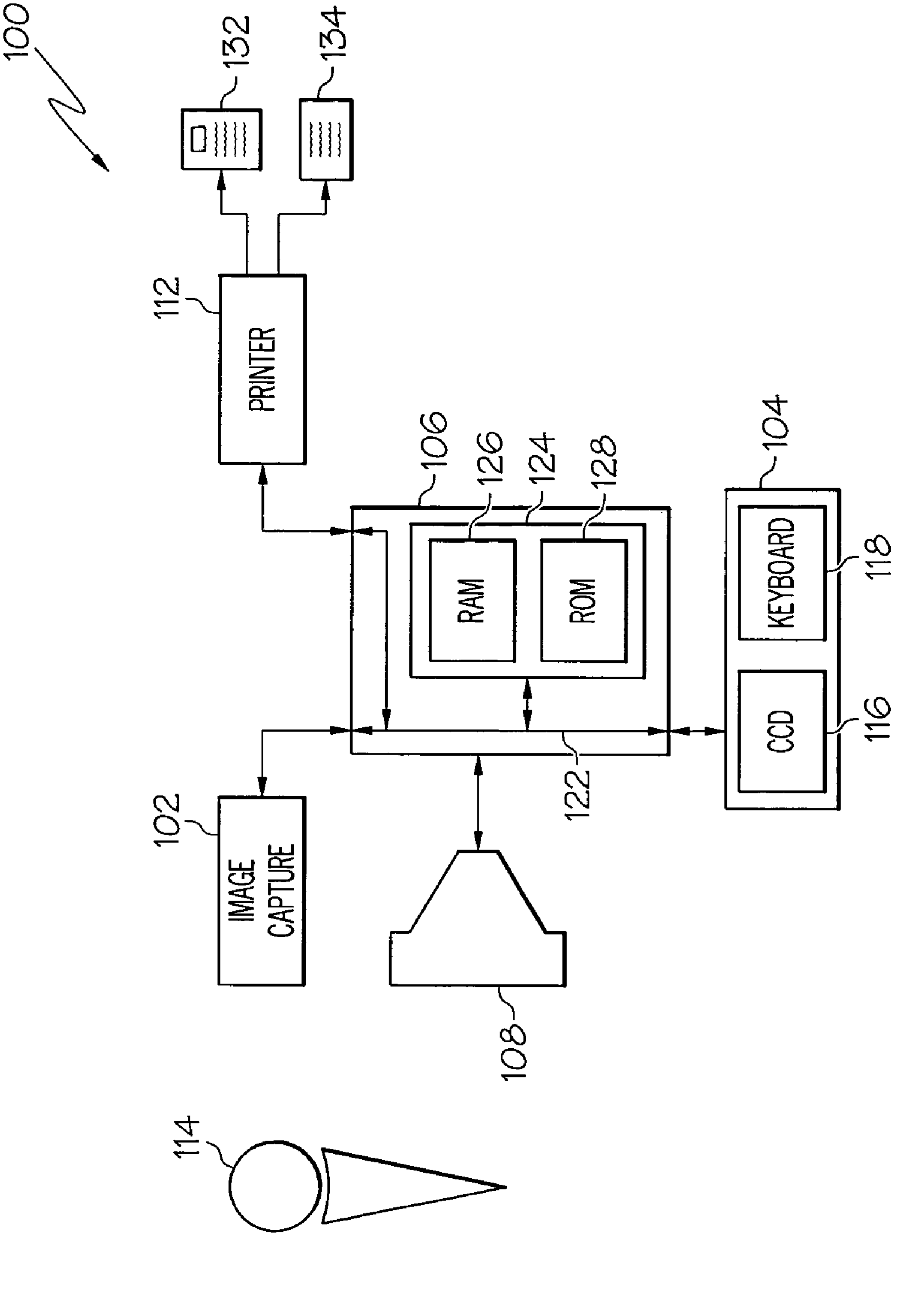
FIG. 1 is a functional block diagram of a system according to an exemplary embodiment of the present invention.

Turning now to the description, and with reference first to FIG. 1, an exemplary system 100 for generating and supplying visitor badges and associated business cards is shown in functional block diagram form. The exemplary system 100 includes an image capture device 102, a user interfaces 104, a central processing unit (CPU) 106, a video display device 108, and a printer 112. The image capture device 102 is in operable communication with the CPU 106 and is configured to selectively capture an image of a visitor 114 and supply visitor image data representative of the captured video image to the CPU 106. The image capture device 102 may be any one of numerous types of devices now known or developed in the future that implements this function. For example, the image capture device 102 may be any one of numerous types of image scanners, any one of numerous types of digital cameras, any one of numerous types of digital video recorders, or any one of numerous types of web cameras. Preferably, the image capture device 102 is a USB (universal serial bus) compatible camera with at least 640×480 image capture resolution and that operates at 30 or more frames per second. Alternatively, the visitor image can be pre-stored in the system 100.

The user interface 104 is in operable communication with the CPU 106 and is configured to receive input from a user, which may either be the visitor 114 or another non-illustrated person, and, in response to the user input, to supply data or command signals to the CPU 106. For example, the user interface 104, as will be described in more detail further below, is configured to receive visitor personal data that is representative of personal data specific to the visitor 114, and to supply these data to the CPU 106. The user interface 104 may be any one, or combination, of various known user interface devices including, but not limited to, a cursor control device (CCD), such as a mouse, a trackball, or joystick, and/or a keyboard, and/or one or more buttons, switches, or knobs. In the depicted embodiment, the user interface 104 includes a CCD 116 and a keyboard 118. The user uses the CCD 116 to, among other things, move a cursor symbol displayed on the video display device 108 and to select various items graphically displayed on video display device 108. The user uses the keyboard 118 to, among other things, input various data.

The CPU 106 is in operable communication with the image capture device 102, the user interface 104, the display device 108, and the printer 112 via, for example, a plurality of input/output (I/O) interfaces (not shown) and a communication bus 122. It will be appreciated that the CPU 106 and one or more of the image capture device 102, the user interface 104, the display device 108, and the printer 112 could be in operable communication via a local area network (LAN) or a wide area network (WAN), either of which may be implemented using hardwired communication or wireless communication. The CPU 106 is coupled to receive the visitor image data from the image capture device 102 and the visitor personal data from the user interface 104, and is operable to selectively supply appropriate display commands to the video display device 108 and appropriate image print commands to the printer 112. The display commands cause the display device 108 to render various images, and the print commands, as will be discussed in more detail further below, cause the printer 112 to print various images, which may include both text and graphics.

The CPU 106 may include one or more microprocessors, each of which may be any one of numerous known general-purpose microprocessors or application specific processors that operate in response to program instructions. In the depicted embodiment, the CPU 106 includes a single PC-compatible microprocessor 124, RAM (random access memory) 126, and ROM (read only memory) 128. The program instructions that control the microprocessor 124 may be stored in either or both the RAM 126 and the ROM 128. For example, the operating system software may be stored in the ROM 128, whereas various software routines and various data, such as the aforementioned visitor image data and visitor personal data, may be stored in the RAM 126. It will be appreciated that this is merely exemplary of one scheme for storing operating system software, software routines, and data, and that various other storage schemes may be implemented.

The video display device 108 is used to display various images and data, in both a graphical and a textual format, and to supply visual feedback to a user in response to display commands supplied from the CPU 106. It will be appreciated that the video display device 108 may be any one of numerous known displays suitable for rendering textual and/or graphical images in a viewable format. Non-limiting examples of such displays include various cathode ray tube (CRT) displays, and various flat panel displays such as, for example, various types of LCD (liquid crystal display) and TFT (thin film transistor) displays.

The printer 112 is used to print various graphical and textual images on print media in response to image print commands supplied from the CPU 106. The printer 112 may be implemented as a single printer or as a plurality of printers, and the single or plural printers may be any one, or combination, of numerous types of printers now known or developed in the future. For example, the printer 112 may be one or more inkjet printers, one or more laser or other thermal printers, or a combination of printer types. The printer 112 may additionally be configured as a sheet-fed printer or a roll-fed printer, depending on the configuration of the print media being used. Moreover, the printer 112, if implemented as a single printer, may include either a single print media feeder, or two or more print media feeders. The images that the printer 112 is configured to print include, but are not limited to, a visitor identification badge image and a visitor business card image. The visitor identification badge image is printed on printable media that will implement a visitor identification badge 132, and the visitor business card image is printed on printable media that will implement a visitor business card 134. Alternatively, the same media could be used for printing both the visitor business card 134 and the visitor identification badge 132. If the visitor identification badge 132 and the visitor business card 134 are printed on different print media, the different print media may be loaded in separate printers 112. For example, the print media used to implement the visitor identification badge 132 could be loaded into one printer 112, and the print media used to implement the visitor business card 134 could be loaded into another printer.

The visitor identification badge 132 and the visitor business card 134, when implemented, are preferably configured so that a visitor business card 134 will not be used or mistaken for a visitor identification badge 132. In one exemplary embodiment this is accomplished by implementing the visitor identification badge 132 and the visitor business card 134 using different types of printable media. For example, the visitor identification badge 132 may be implemented via an adhesively-backed label that is removable from a sheet or roll of print stock having a plurality of labels disposed thereon, or any other suitable print media. The visitor business card 134 may be implemented via a sheet or roll of print stock having one or more readily detachable business cards, or via off-the-shelf Avery Dennison Clean Edge™ business card media or any other print media. Alternatively, or additionally, the visitor identification badge 132 and the visitor business card 134 may be shaped and/or colored differently. In yet another alternative embodiment, the visitor identification badge 132 and visitor business card 134 include some type of differentiating indicia that prevents the visitor 114 from using a visitor business card 134 as a visitor identification badge 134. It will be appreciated that printable media that is used to implement the visitor identification badge 132 and the visitor business card 134 may be formed on separate print stock or on the same print stock.

Figure 2:
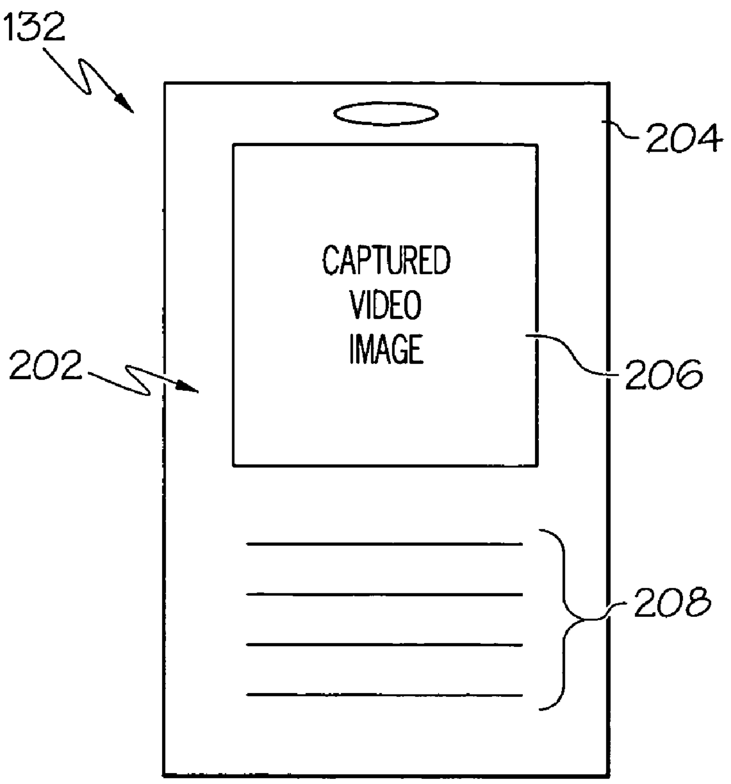
FIG. 2 shows an exemplary visitor identification badge that may be printed using the system of FIG. 1.
Figure 3:
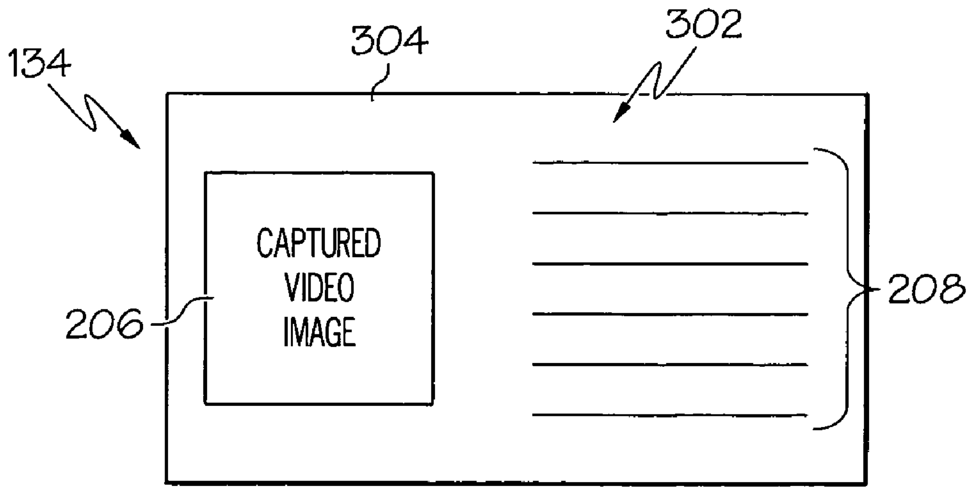
FIG. 3 shows an exemplary visitor business card that may be printed using the system of FIG. 1.

The visitor identification badge 132, an exemplary embodiment of which is shown in FIG. 2, includes the visitor identification badge image 202 printed on a suitable print media 204. The visitor identification badge image 202 preferably includes both graphical and textual images, and may be printed on the print media 204 in either the portrait or the landscape format. In the embodiment shown in FIG. 2, the visitor identification badge image 202 is printed in the portrait format on the print media 204, and includes the captured video image of the visitor 206 and at least selected portions of the visitor personal data 208. The visitor business card 134, an exemplary embodiment of which is shown in FIG. 3, includes the visitor business card image 302 printed on a suitable print media 304. Similar to the visitor identification badge image 202, the visitor business card image 302 also preferably includes both graphical and textual images, and may additionally be printed on the print media 304 in either the portrait or the landscape format. In the embodiment shown in FIG. 3, the visitor business card image 302 is printed in the landscape format on the print media 304, and includes the captured video image of the visitor 206 and at least selected portions of the visitor personal data 208.

It will be appreciated that the specific type and amount of visitor personal data 208 that is included in both the visitor identification badge image 202 and the visitor business card image 302 may vary, and is preferably selectable via the user interface 104 and the CPU 106. It will additionally be appreciated that the visitor business card image 302 could be printed, if so desired, without the captured video image of the visitor 206 and with different visitor personal data 208 than that which is included in the visitor identification badge image 202. A pre-stored visitor image may also be used. Moreover, as was mentioned above, the visitor identification badge image 202 or the visitor business card image 302 could additionally include some type of indicia 212 that clearly differentiates the visitor identification badge 132 from the visitor business card 134. For both images 202, 302, the captured video image of the visitor 206, if included, is preferably printed in color, if the printer 112 is configured to do so, and the visitor personal data 204 may be printed out in any one of numerous user-selectable fonts and user-selectable colors.

The printable media 204 on which visitor identification badge image 202 is printed is preferably configured to function as the identification badge 132. Thus, the visitor identification badge image 202 is preferably dimensioned to fit in a print region that is about the size of a standard identification badge. For example, many standard identification badges are approximately 3⅜ inches by 2⅛ inches. It will be appreciated, however, that the specific size and configuration of the visitor identification badge print media 204 may vary. Indeed, suitable print media of numerous sizes, shapes, types, and configurations that are now known, or become available in the future, and that are usable as the identification badge 132 may be used. It will additionally be appreciated that the specific size and format (e.g., portrait or landscape) in which the visitor identification badge image 200 is printed may vary. The size and format are preferably user-selectable, and may vary with the particular visitor identification badge print media 204 that is used. It will additionally be appreciated that the size and format may be automatically adjusted based on the particular print media 204 that is loaded in the printer 112.

The print media 304 on which the visitor business card image 302 is printed is configured to function as the visitor business card 134. Thus, the visitor business card image 302 is preferably dimensioned to fit in a print region that is about the size of a standard business card. For example, many standard cards are approximately 3½ inches by 2 inches. It will be appreciated, however, that the specific size and configuration of the business card image print media 304 may vary. Indeed, suitable print media of numerous sizes, shapes, types, and configurations that are now known, or become available in the future, and that are usable as a visitor business card 134 may be used. As with the visitor identification badge image 200, the size and format of the visitor business card image 300 are preferably user-selectable, and may vary with the particular visitor business card print media 304 that is used. It will additionally be appreciated that the size and format may be automatically adjusted based on the particular print media 304 that is loaded in the printer 112.

Figure 4:
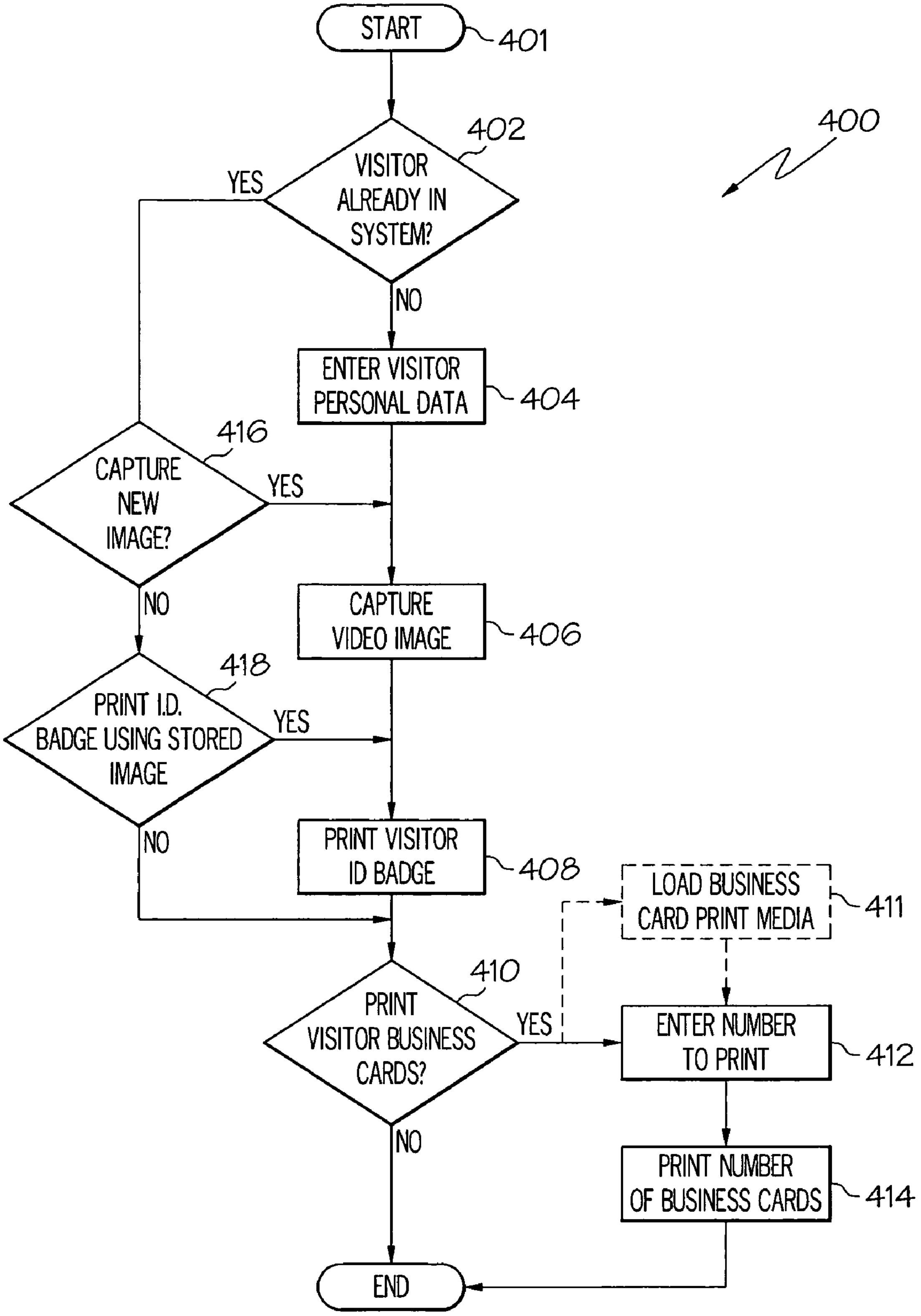
FIG. 4 is a flowchart illustrating an exemplary process that may be implemented by the system of FIG. 1 to produce the exemplary visitor identification badge and exemplary visitor business card shown in FIGS. 2 and 3, respectively.

Having described the configuration and general functionality of the system 100 and the configuration of exemplary visitor identification badges 132 and visitor business cards 134 that the system 100 may print, a more detailed description of an exemplary process 400 that the system 100 implements to print visitor identification badges 132 and visitor business cards 134 will now be described. In doing so, reference should be made to FIG. 4, which depicts the exemplary process 400 in flowchart form. It is noted that the parenthetical references in the following paragraphs refer to like steps in the depicted flowchart.

When a visitor 114 approaches a visitor check-in/log-in station at the facility where the system 100 is located, a system user, which may be the visitor 114 or another person, may initiate the process 400 via, for example, the user interface 104. Upon initiation, a determination is first made as to whether the user 114 has already been entered into the system (402). This determination may be done in any one of numerous ways. For example, the CPU 106 may display an appropriate query on the video display device 108 that asks the user whether or not the visitor 114 is already entered in the system 100. The user, using the user interface 104, may then appropriately respond to the query. Alternatively, the system 100 may automatically make this determination upon entry, via the user interface 104, of various visitor personal data such as, for example, the visitor's name or email address.

No matter the specific manner-in which this determination is made, if the visitor 114 has not been entered into the system 100, then the user is prompted to enter visitor personal data (404). The visitor personal data is preferably entered, via the user interface 104, into various fillable fields that the CPU 106 causes to be displayed on the video display device 108. The visitor personal data that the user enters may vary, and may include, for example, the name, company, business address, telephone number, and e-mail address of the visitor. Before proceeding further, it is seen that if the visitor 114 has already been entered into the system 100, then one or more different steps (416, 418) are implemented. These other steps are described in more detail further below.

Once the visitor personal data has been entered, the user is then prompted, preferably via the video display device 108, to photograph the visitor 114 (406) if a pre-stored image is not available and/or is not to be used. To do so, the visitor 114 stands at an appropriate distance from the image capture device 102. In response to an input from the user interface 104, the CPU 106 supplies a command to the image capture device 102 that causes the image capture device 102 to capture a video image of the visitor 114 and supply visitor image data representative of the captured image to the CPU 106.

Thereafter, the printer 112 prints a visitor identification badge 132 (408). To do so, the CPU 106, either automatically or in response to an input from the user interface 104, supplies a visitor identification badge print command to the printer 112. The printer 112, in response to the visitor identification badge print command, prints the visitor identification badge image 202 on the identification badge print media 204. The system 100 then determines via, for example, a query displayed on the video display device 108, whether the visitor 114 would like to have one or more visitor business cards 134 printed out (410). If so, the user enters the desired number of visitor business cards 134 to be printed (412), and the printer 112 then prints the visitor business cards 134 (414). To do so, the CPU 106, either automatically or in response to an input from the user interface 104, supplies a visitor business card print command to the printer 112. The printer 112, in response to the visitor business card print command, prints the visitor business card image 302 on the business card printable media 304. Alternatively, the system 100 can be pre-set to automatically print out a certain number of visitor business cards 134 after each visitor identification badge 132 is printed. This would automate or preset steps 410, 412 and 414.

As was previously noted, if the visitor 114 has already been entered into the system 100, then one or more different steps (416, 418) are implemented. In particular, a determination is made as to whether a new image of the visitor is to be captured (416). If a new image is to be used, then the process 400 proceeds to step 406 and the subsequent steps. If a new image is not to be used, then a determination is made as to whether an identification badge 132 is to be printed using the stored image (418). If so, then the process 400 proceeds to step 408 and the subsequent steps, if not, then the process 400 proceeds to step 410 and subsequent steps.

Once the visitor 114 has been entered into the system 100, the visitor 114 may return to the originating station or to another station if the system 100 is networked with other like systems 100 at the facility, and have visitor business cards 134 printed. It was also previously noted that in some embodiments the printer 112 may be implemented as a single printer with only a single media feeder. For such embodiments, and as shown in phantom in FIG. 4, the system 100 first prompts the user to load the business card printable media 304 into the print feeder (411), before printing out the desired quantity of visitor business cards 134.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A system for printing visitor identification badges and associated visitor business cards with a visitor image, comprising:

a storage device configured to store visitor image data representative of an image of a visitor;

a user interface configured to receive visitor personal data supplied from a user, the visitor personal data representative of personal data specific to the visitor; and a central processing unit (CPU) coupled to receive the visitor image data and the visitor personal data and configured to selectively supply a visitor identification badge print command and a visitor business card print command, wherein:

the visitor identification badge print command will cause a printer to print a visitor identification badge image, the visitor identification badge image including the image of the visitor and at least selected portions of the visitor data, and the visitor business card print command will cause a printer to print a visitor business card image, the visitor business card image including at least selected portions of the visitor data.

2. The system of claim 1, further comprising:

a printer adapted to receive the identification badge print command and the business card print command and operable, upon receipt thereof, to print one or more visitor identification badge images and one or more visitor business cards, respectively.

3. The system of claim 2, wherein the CPU is selectively configurable to command the printer to print the visitor identification badge and a predetermined quantity of the visitor business cards.

4. The system of claim 1, further comprising:

a first printer adapted to receive the identification badge print command and operable, upon receipt thereof, to print one or more visitor identification badge images; and a second printer adapted to receive the business card print command and operable, upon receipt thereof, to print one or more visitor business cards.

5. The system of claim 1, wherein the visitor business card image further includes the image of the visitor.

6. The system of claim 1, wherein the visitor identification badge image is dimensioned to be printable on print media configured to be worn by the visitor.

7. The system of claim 1, wherein the visitor business card image is dimensioned to be printable in a print region about the size of a standard business card.

8. The system of claim 1, wherein the visitor business card image includes indicia that differentiates the visitor business card from the visitor identification badge.

9. The system of claim 1, further comprising:

an image capture device configured to selectively capture the image of the visitor and supply the visitor image data that is stored in the storage device.

10. A system for printing visitor identification badges and associated visitor business cards, comprising:

an image capture device configured to selectively capture an image of a visitor and supply visitor image data representative thereof;

a user interface configured to receive visitor personal data supplied from a user, the visitor personal data representative of personal data specific to the visitor; and a central processing unit (CPU) coupled to receive the visitor image data and the visitor personal data and configured to selectively supply a visitor identification badge print command and a visitor business card print command, wherein:

the visitor identification badge print command will cause a printer to print a visitor identification badge image, the visitor identification badge image including the captured image and at least selected portions of the visitor data, and the visitor business card print command will cause a printer to print a visitor business card image, the visitor business card image dimensioned to be printable in a print region no larger than a standard business card, and including at least selected portions of the visitor data.

11. The system of claim 10, further comprising:

a printer adapted to receive the identification badge print command and the business card print command and operable, upon receipt thereof, to print one or more visitor identification badge images and one or more visitor business cards, respectively.

12. The system of claim 10, further comprising:

a first printer adapted to receive the identification badge print command and operable, upon receipt thereof, to print one or more visitor identification badge images; and a second printer adapted to receive the business card print command and operable, upon receipt thereof, to print one or more visitor business cards.

13. The system of claim 10, wherein the visitor business card image further includes the captured image.

14. The system of claim 10, wherein the visitor identification badge image is dimensioned to be printable on print media configured to be worn by the visitor.

15. The system of claim 10, wherein the visitor business card image includes indicia that differentiates the visitor business card from the visitor identification badge.

16. A system for printing visitor identification badges and associated visitor business cards, comprising:

an image capture device configured to selectively capture an image of a visitor and supply visitor image data representative thereof;

a user interface configured to receive visitor personal data supplied from a user, the visitor personal data representative of personal data specific to the visitor; and a central processing unit (CPU) coupled to receive the visitor image data and the visitor personal data and configured to selectively supply a visitor identification badge print command and a visitor business card print command, wherein:

the visitor identification badge print command will cause a printer to print a visitor identification badge image, the visitor identification badge image including the captured image and at least selected portions of the visitor data, and the visitor business card print command will cause a printer to print a visitor business card image, the visitor business card image including at least selected portions of the visitor data and indicia that differentiates the visitor business card from the visitor identification badge.

17. The system of claim 16, further comprising:

a printer adapted to receive the identification badge print command and the business card print command and operable, upon receipt thereof, to print one or more visitor identification badge images and one or more visitor business cards, respectively.

18. The system of claim 16, further comprising:

a first printer adapted to receive the identification badge print command and operable, upon receipt thereof, to print one or more visitor identification badge images; and a second printer adapted to receive the business card print command and operable, upon receipt thereof, to print one or more visitor business cards.

19. The system of claim 16, wherein the visitor business card image further includes the captured image.

20. The system of claim 16, wherein the visitor identification badge image is dimensioned to be printable on print media configured to be worn by the visitor.

21. The system of claim 16, wherein the visitor business card image is dimensioned to be printable in a print region about the size of a standard business card.

22. A method of supplying visitor identification badges and associated visitor business cards to a visitor, comprising the steps of:

supplying visitor image data representative of a video image of the visitor;

receiving visitor personal data, the visitor personal data representative of personal data specific to the visitor; and selectively printing a visitor identification badge and a visitor business card, wherein the visitor identification badge includes at least the captured video image and at least selected portions of the visitor data, and wherein the visitor business card includes at least selected portions of the visitor data.

* * * * *